(12) United States Patent
Stevenson et al.

(10) Patent No.: US 6,364,616 B1
(45) Date of Patent: Apr. 2, 2002

(54) SUBMERGED RIB HYBRID BLADE

(75) Inventors: Joseph Timothy Stevenson, Amelia, OH (US); Wendy Wen-Ling Lin, Niskayuna, NY (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/567,553

(22) Filed: May 5, 2000

(51) Int. Cl.[7] .............................................. B64C 11/16

(52) U.S. Cl. ................... 416/233; 416/224; 416/229 R; 416/229 A; 416/241 A

(58) Field of Search ............................. 416/224, 241 A, 416/235, 233, 229 R, 232, 500, 230, 229 A, 144, 145

(56) References Cited

U.S. PATENT DOCUMENTS

| | | | | |
|---|---|---|---|---|
| 4,648,921 A | * | 3/1987 | Nutter, Jr. ................ | 416/229 R |
| 5,295,789 A | | 3/1994 | Daguet .................... | 416/241 A |
| 5,655,883 A | | 8/1997 | Schilling ................. | 416/229 A |
| 5,720,597 A | * | 2/1998 | Wang et al. ............. | 416/229 A |
| 5,947,688 A | | 9/1999 | Schilling et al. ............ | 416/233 |
| 6,039,542 A | | 3/2000 | Schilling et al. ............ | 416/233 |
| 6,048,174 A | * | 4/2000 | Samit et al. ............. | 416/229 A |

* cited by examiner

Primary Examiner—Edward K. Look
Assistant Examiner—Richard Woo
(74) Attorney, Agent, or Firm—Andrew C. Hess; Nathan D. Herkamp

(57) ABSTRACT

A fan blade includes a metal airfoil having a pocket disposed in a first side thereof, with the pocket including a filler bonded thereto. The pocket includes a plurality of cells separated by corresponding ribs which are submerged in the filler.

20 Claims, 2 Drawing Sheets

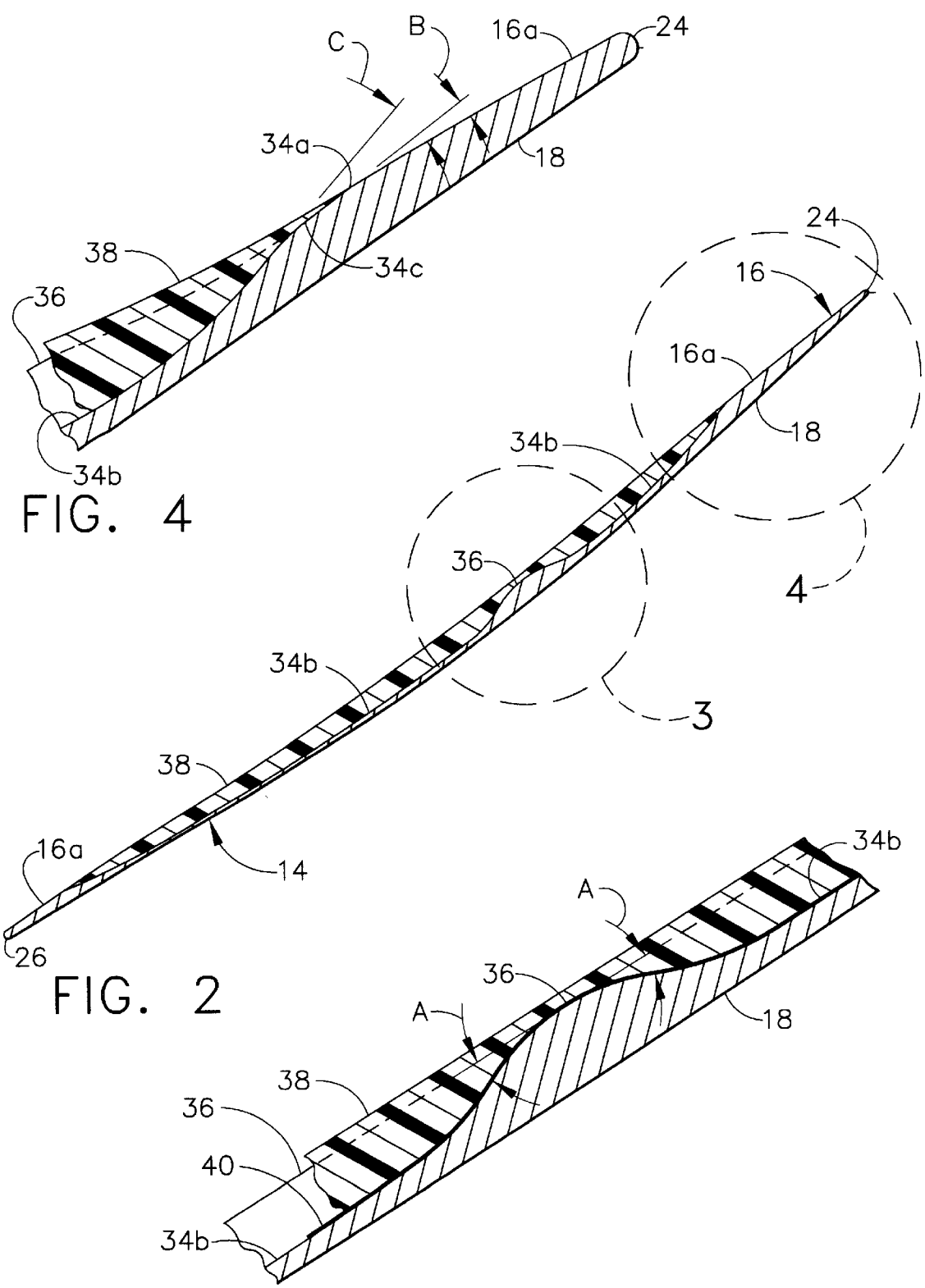

SUBMERGED RIB HYBRID BLADE

BACKGROUND OF THE INVENTION

The present invention relates generally to gas turbine engines, and, more specifically, to wide chord fan blades therein.

A turbofan gas turbine engine includes a row of fan blades powered by a low pressure turbine (LPT). Air initially enters the engine through the fan, and an inner portion thereof enters a compressor which pressurizes the air for mixing with fuel in a combustor, with the mixture being ignited for generating hot combustion gases that flow downstream through a high pressure turbine (HPT) that extracts energy for powering the compressor. The combustion gases then flow through the LPT which extracts additional energy therefrom for powering the fan. The remaining outer portion of the air flowing through the fan is discharged from the engine for producing thrust to power an aircraft in flight.

A fan blade includes a dovetail at its radially inner end which is trapped in a complementary dovetail slot in the perimeter of a rotor disk. An airfoil is attached to the dovetail by a structural shank. Platforms may be joined integrally with the blade or separately attached between adjacent blades for providing a radially inner flowpath boundary for the fan air, with the platform being radially located atop the shank at a radially inner root of the airfoil.

The airfoil extends radially outwardly to an opposite tip, and has a forward or leading edge and an axially opposite aft or trailing edge collectively defining the perimeter of the airfoil. The airfoil has a generally concave, pressure first side and a circumferentially opposite, generally convex, suction second side. The airfoil has a span or longitudinal axis extending in the radial direction from the centerline of the rotor disk to which it is attached, and various chords extending generally axially between the leading and trailing edges. The airfoil typically twists from its root to its tip for maximizing aerodynamic performance.

A wide chord fan blade has a relatively low aspect ratio which is its span to chord ratio, and is relatively heavy when formed as a solid metal part. Weight reduction is typically obtained by using high strength superalloy materials such as those including titanium. However, as engines grow larger in size, the corresponding fan blades increase in size and weight, and increase the difficulty in achieving a suitable life therefor under the high centrifugal loads generated during operation.

In separate developments, all-composite fan blades have been designed for reducing weight while providing acceptable performance in the gas turbine engine environment. A typical composite blade includes several layers of structural fibers, such as graphite, embedded in a suitable matrix, such as epoxy, for tailoring blade strength in a lightweight structure. Composite blades require a complex manufacturing process and are expensive to produce.

Hybrid blades are also being developed which are primarily metal, such as titanium, having suitable pockets therein for reducing weight, with the pockets being filled with a suitable elastomeric filler material for completing the required aerodynamic profile of the airfoil. The pockets are defined by corresponding integral metal ribs which provide metal across the full thickness of the airfoil for maximizing the remaining stiffness and bending moment of inertia of the airfoil.

However, the weight-reducing pockets necessarily interrupt the structural continuity of the airfoil, with the exposed edges of the pockets creating structural discontinuities in the airfoil surface adjoining the filler material. The ribs are therefore subject to local stress concentration during operation.

During operation, the fan blades rotate and are subject to centrifugal loads which are carried by the metal portion of the airfoils including the ribs, with the filler merely providing dead weight which in turn is carried by the metal portion of the airfoil. The airfoil is subject to vibratory bending and torsion which in turn increases the loads and resulting stress carried by the metal airfoil including the ribs thereof. And, the fan blade is subject to foreign object damage (FOD) due to impact from a bird strike for example. A bird strike subjects the blade to additional shock loading which further increases the stress of the metal airfoil including the ribs.

In order to ensure a strong bond between the filler and the underlying metal of the airfoil, a primer coat may be applied in the pockets prior to filling with the filler material. When the filler is cured and bonded to the metal airfoil, its outer surface is directly exposed to the ambient air and is coextensive or flush with the remaining metal border of the airfoil for defining the corresponding aerodynamically configured side of the airfoil.

However, the underlying primer is exposed along the edge interface between the filler and the metal border and is therefore subject to degradation due to humidity, chemical solvents, and handling damage. Degradation of the primer can then lead to delamination of the filler from the metal airfoil, and a corresponding reduction in useful life of the fan blade.

Accordingly, it is desired to provide an improved hybrid fan blade having reduced stress concentrations and reduced exposure of the filler-metal interface.

BRIEF SUMMARY OF THE INVENTION

A fan blade includes a metal airfoil having a pocket disposed in a first side thereof, with the pocket including a filler bonded thereto. The pocket includes a plurality of cells separated by corresponding ribs which are submerged in the filler.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which:

FIG. 2 is a radial sectional view through a mid-span portion of the airfoil illustrated in FIG. 1 and taken generally along line 2—2.

FIG. 3 is an enlarged radial sectional view of an exemplary submerged rib of the airfoil illustrated in FIG. 2 within the dashed circle labeled 3.

FIG. 4 is an enlarged radial sectional view of the pocket adjoining the metal border near the leading edge as shown within the dashed circle labeled 4 of FIG. 2 in accordance with an exemplary embodiment of the present invention.

DETAILED DESCRIPTION OF THE INVENTION

Figure 1:
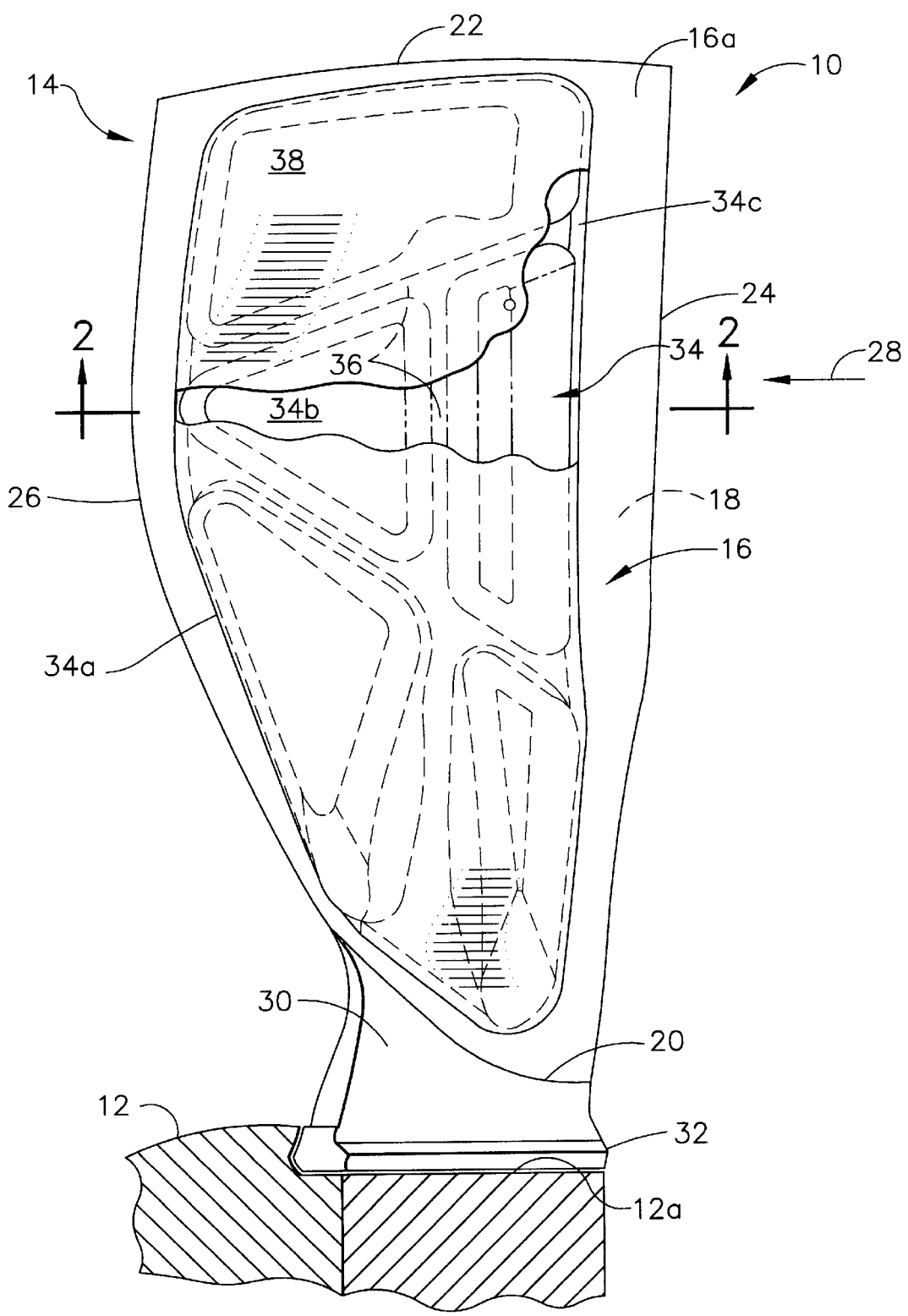
FIG. 1 is an elevational view of an exemplary gas turbine engine hybrid fan blade including a multi-cell pocket including a filler therein in accordance with an exemplary embodiment of the present invention.

Illustrated in FIG. 1 is one of several exemplary turbofan gas turbine engine fan rotor blades 10 mounted to the perimeter of a rotor disk 12 shown in part. In accordance with the present invention, the blade is configured as a hybrid blade including a metal airfoil 14 having a first or pressure side 16 which is generally concave, and a circumferentially opposite second or suction side 18 which is generally convex. The first and second sides or surfaces 16, 18 extend radially along the span of the airfoil between a radially inner root 20 and an opposite radially outer tip 22.

The first and second sides also extend axially along the chords of the airfoil between a forward or leading edge 24, and an axially opposite aft or trailing edge 26. Ambient air 28 flows over the two airfoil sides from the leading edge to the trailing edge during operation and is pressurized by the airfoil in a conventional manner for producing propulsion thrust for powering an aircraft in flight.

Although the airfoil 14 may be integrally or directly mounted to the rotor disk 12 in a one-piece assembly known as a blisk, in the exemplary embodiment illustrated in FIG. 1 each of the airfoils is removably attached to the disk in a conventional manner. For example, the blade further includes a metal shank 30 joined integrally with the airfoil root 20 for mounting the blade to the rotor disk 12. This is effected using a conventional metal dovetail 32 joined integrally with the shank for mounting the blade in a complementary dovetail slot 12a in the rotor disk. The airfoil 14, shank 30, and dovetail 32 may be initially formed as a one-piece or unitary metal structure such as by forging. A suitable metal for the fan blade is titanium, for example.

The dovetail 32 is typically an axial-entry dovetail which is captured in a complementary axial dovetail slot 12a in the perimeter of the rotor disk. The shank 30 provides a structural transition from the dovetail to the aerodynamic airfoil, and is typically not an aerodynamic member itself. The shank is typically hidden from the airflow by a suitable flow bounding platform (not shown) disposed at the airfoil root 20 either integrally therewith or as separately mounted platforms between adjacent ones of the blades in a conventional manner.

In accordance with the present invention, the airfoil 14 includes a recess or pocket 34 preferably disposed solely in the airfoil first or pressure side 16, with the pocket having a full four-sided perimeter 34a extending along a border 16a of the airfoil first side around the leading and trailing edges 24, 26, root 20, and tip 22.

The pocket 34 includes a plurality of compartments or cells 34b separated from each other by corresponding metal ribs 36. In the exemplary embodiment illustrated in FIG. 1, multiple chordal and radial ribs 36 intersect each other for defining five exemplary pocket cells 34b.

The entire pocket including its cells includes an elastomeric filler 38 suitably bonded therein, with the ribs 36 being recessed or submerged in the filler below the exposed surface thereof.

The basic airfoil 14 illustrated in FIG. 1 is metal for providing structural integrity for withstanding aerodynamic, centrifugal, and vibratory loads during operation as the fan blade rotates for producing propulsion thrust by pressurizing the air 28. The pocket including its cells is provided in the airfoil for substantially reducing the overall weight thereof, and reducing the centrifugally generated loads during operation. The filler 38 is relatively lightweight and may take any suitable form such as elastomeric rubber or polyurethane for filling the pocket to provide a continuous surface over the airfoil first side which is exposed to the airflow 28 for pressurization thereof.

FIG. 2 illustrates an exemplary radial sectional view through a portion of the airfoil illustrated in FIG. 1, with the metal airfoil and blade being continuous from the leading edge 24 to the trailing edge 26, as well as being continuous from the dovetail 32 to the airfoil tip 22 as illustrated in FIG. 1. As shown in FIG. 2, the leading and trailing edges 24, 26 are relatively thin and sharp for maximizing aerodynamic efficiency and are completely metal between the suction side 18 and the border portion 16a of the pressure side 16 for maintaining strength and structural integrity of the airfoil, notwithstanding the introduction of the pocket 34 including its several cells.

The cells 34b are defined around their perimeters by respective ones of the ribs 36 and the corresponding portions of the first side border 16a. The collective profile of the airfoil 14 illustrated in FIG. 2 defines between its two opposite sides a suitable aerodynamic profile specifically configured for maximizing efficiency of pressurizing the ambient air during operation. The metal airfoil is relatively thin at the individual cells 34b for minimizing airfoil weight while maintaining a continuous structural loadpath over the entire airfoil for maintaining structural integrity thereof.

The filler 38 is introduced into the cells to replace the metal volume otherwise lost by the introduction of the cells themselves to return the airfoil to the required aerodynamic profile including the filler 38 in the first side 16. In this way, the airfoil first side 16 is defined in part by the border 16a directly exposed to the ambient air, and defined in remaining part by the exposed outer surface of the filler 38. The hidden portion of the airfoil first side below the filler 38 defines the several cells 34b and ribs 36 interposed therebetween.

FIG. 3 illustrates in more particularity an exemplary one of the submerged ribs 36 and the overlying filler 38 exposed to the ambient air. As indicated above, the filler 38 may be any suitable material preferably elastomeric for accommodating elastic strain during operation as the metal airfoil is loaded during operation. The elastomeric filler 38, such as polyurethane, is preferably bonded to a primer 40 which first coats or covers the pocket including its cells 34b and ribs 36. A suitable primer is TyPly BN, available from the Lord Corporation, Erie, Pa.

As shown in FIG. 4, the filler 38 is preferably flush or coextensive with the airfoil border 16a, and defines therewith a continuous aerodynamic surface exposed to the air which is channeled thereover. The filler 38 thusly adjoins the metal border 16a around the full perimeter 34a of the pocket which directly exposes to the ambient air the edge of the underlying primer.

A particular advantage of the present invention is that the several ribs 36 illustrated in FIGS. 1–3 are submerged in the filler 38, and thusly do not create additional sites where the primer is exposed to the airfoil surface. Surface exposure of the primer is thus limited to the perimeter 34a of the pocket illustrated in FIG. 1, with the several ribs 36 being submerged within the filler. In this way, the perimeter edges of the filler itself are limited in extent, which correspondingly limits the available filler sites subject to degradation over life of the blade.

However, submerging the ribs 36 below the filler, and below the aerodynamic profile defined thereby, correspondingly reduces the bending moment of inertia of the metal airfoil and its corresponding strength.

In the preferred embodiment, the ribs 36 are submerged in the filler to a limited extent in the preferred range of about 0.5–2.5 mm for retaining a relatively thin web or ligament of the filler 38 directly thereatop as illustrated in FIG. 3. In this way, a continuous surface of the filler 38 is exposed to the ambient air and defines a major portion of the exposed airfoil first side which is coextensive with the border 16a as shown in FIG. 1.

However, since the ribs 36 themselves are integral portions of the metal airfoil, they provide structural integrity of the airfoil itself and carry substantial loads during operation. Ribs used in earlier developments of the hybrid blade were exposed at the airfoil surface for maintaining strength, and would thusly expose additional primer to the environment. Those early ribs typically have parallel sides and corresponding sharp corners which effect considerable stress concentrations and locally increase stress during operation.

In order to reduce stress concentration, the several ribs 36 each have an arcuate lateral section or profile as illustrated in detail in FIG. 3. The rib 36 is generally convex or rounded outwardly without sharp corners.

Each rib 36 is generally symmetrical in transverse or lateral section and includes opposite sides which are tapered or sloped with corresponding side taper angles A measured relative to the horizontal or generally flat surface of the filler 38. The fib sides taper smoothly from the rounded apex of the rib to the relatively flat bottoms of the adjoining cells 34b in a smooth transition.

The profile of each rib 36 is tapered and blended for several purposes. Fundamentally, the ribs are provided to separate the individual cells 34b while maintaining structural integrity of the metal airfoil. If the taper angle A of the rib sidewalls is too shallow or small, the volume of the adjoining pockets will be correspondingly small and weight reduction will be limited. If the taper angle A is too sharp or large, corresponding interface stresses between the ribs and filler will increase. And, the side taper angles may be equal or unequal as desired for minimizing interface stress and airfoil weight.

Furthermore, the ribs 36 are submerged below the exposed surface of the filler 38 for maintaining the continuity of the filler as an aerodynamic surface, yet submergence of the rib correspondingly reduces the bending moment of inertia of the airfoil section and can increase stress therein.

Accordingly, the rib apexes are subject to high stress during operation which is reduced in accordance with one feature of the present invention by rounding the apexes with corresponding fillets or radii for eliminating sharp corners.

And, as indicated above, the ribs 36 are submerged below the exposed surface of the filler in the relatively small range of about 0.5–2.5 mm to maximize the strength of the airfoil, while maintaining suitable strength and continuity of the filler ligament bonded atop the ribs.

Since the several ribs 36 illustrated in FIG. 1 are submerged in the filler 38, a single pocket 34 is exposed at the airfoil surface and has the continuous surrounding perimeter 34a. The individual pocket cells 34b are submerged and hidden from view when filled with the filler material.

As indicated above, FIGS. 1 and 2 illustrate a typical fan blade airfoil profile which is relatively thin from leading to trailing edges. The leading and trailing edges 24, 26 themselves are thin and sharp and are formed only of the parent metal material for maintaining strength thereof. The metal airfoil border 16a extends inwardly from the leading and trailing edges for maintaining strength of the airfoil edges prior to transitioning into the adjoining pocket cells 34b.

As shown in FIG. 1, the several ribs 36 are oriented as desired for providing structural integrity of the airfoil for withstanding the typical loads experienced during operation which are carried radially, axially, and torsionally. The loads experienced by the fan blade during operation may also be caused by foreign object damage (FOD), such as due to a bird strike typically at the airfoil leading edge 24.

In order to further increase the structural integrity of the airfoil having the weight reducing pocket therein, the pocket 34, as initially illustrated in FIG. 1, preferably includes a submerged shelf 34c which extends continuously around the pocket perimeter 34a for blending the pocket with the metal border 16a.

A sectional view of the shelf 34c in a preferred embodiment is illustrated in more detail in FIG. 4. The shelf 34c is tapered at a taper angle B from the surface of the airfoil border 16a inwardly into the pockets. In this way, the shelf defines a pronounced slope or ramp from the pocket edge defining the perimeter 34a and provides a smooth transition between the airfoil border 16a into the corresponding pocket cells 34b in which the metal airfoil decreases in thickness.

In this way, relatively sharp corners or abrupt changes in metal continuity are reduced or eliminated for correspondingly reducing stress concentration at the juncture of the filler and the metal border 16a. The various loads generated during operation of the fan blade, including bird strike loads, are thusly more efficiently carried through the metal airfoil between the leading and trailing edges and from root to tip without pronounced stress concentrations either around the perimeter of the pocket, or around the perimeters of the cells 34b thereof or along the individual submerged ribs 36.

As shown in FIG. 1, the shelf 34c is tapered inwardly from the perimeter 34a of the pocket along the several pocket cells 34b as well as along the submerged ribs 36 intersecting the pocket perimeter.

In this way, a distinct shelf 34c is provided continuously around the pocket perimeter 34a and the metal border 16a for providing a smooth transition from the metal border into the corresponding pockets and ribs.

As illustrated in FIG. 4, the shelf 34c has a taper angle B which is preferably different than the taper angle C of the adjoining pocket cells 34b at the intersection therewith. The shelf's taper B is preferably less than the cell taper C thereat to provide a distinct, generally flat shelf around the full perimeter of the pocket and adjoining metal border.

The distinct shelf thusly ensures shallow blending of the cells and ribs at the metal border to reduce stress concentration. And, the distinct shelf is readily defined in computer controlled machines for accurate manufacturing thereof.

As shown in FIGS. 3 and 4, the rib taper angle A is also preferably different than the shelf taper angle B, with the rib taper being preferably greater than the shelf taper. The rib and shelf tapers provide different functions, and are correspondingly different in value. A shallow shelf taper B is preferred to improve the structural integrity of the metal airfoil and continuity of the structural loadpaths between the leading and trailing edges, root, and tip of the airfoil. A larger rib taper is preferred for maximizing the volume of the adjoining pocket cells 34b for reducing blade weight, yet without creating unacceptably large stress concentrations at the ribs themselves.

As shown in FIG. 1, all of the several ribs 36 are preferably substantially equally submerged in the filler 38 to provide similarly thick filler ligaments over the ribs as illustrated in FIG. 3. The submerged ribs blend with the metal border 16a at the pocket shelf 34c as shown in FIG. 4.

The shelf taper angle B is preferably shallow and less than or equal to about 20 degrees, and is preferably about 15 degrees for example. The cell taper angle C at the pocket shelf is slightly larger than the shelf taper angle B by about 2 to 7 degrees in the preferred embodiment.

Correspondingly, the rib taper angle A illustrated in FIG. 3 is preferably less than or equal to about 60 degrees, and is about 20 degrees in the preferred embodiment.

The submerged and tapered ribs provide substantial improvement in structural integrity of the hybrid fan blade disclosed above permitting significant weight reduction while maintaining airfoil strength. Stress concentrations at the ribs are substantially reduced due to the arcuate profiles thereof, and the tapered interface between the pocket and the adjoining metal border therearound further reduces stress concentrations and enhances structural integrity of the airfoil. The filler bonded into the multi-cell pocket has a continuous surface exposed to the ambient air that defines a major portion of the airfoil first side, and which is coextensive and flush with the surrounding metal border 16a that defines the remaining portion of the aerodynamic surface. Exposed primer under the filler is limited solely to the pocket perimeter 34a and substantially reduces sites at which the edges of the filler may be damaged.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A gas turbine engine fan blade comprising:
    a metal airfoil having first and second opposite sides extending radially between a root and a tip, and axially between a leading edge and a trailing edge for pressurizing air channeled thereover;
    said airfoil further including a pocket disposed in said first side, and having a perimeter extending along a border of said first side around said leading and trailing edges, root, and tip;
    said pocket including a plurality of cells separated by corresponding ribs; and
    a filler bonded in said pocket, with said ribs being submerged therein, to define an exposed outer surface of said filler over said ribs.

2. A blade according to claim 1 wherein said ribs are convex in section.

3. A blade according to claim 2 wherein said ribs have tapered sides blending with said cells.

4. A blade according to claim 3 wherein said ribs are submerged in said filler within the range of about 0.5–2.5 mm, and said filler defines an exposed portion of said airfoil first side coextensive with said border.

5. A blade according to claim 1 wherein said pocket includes a shelf around said perimeter blending with said border.

6. A blade according to claim 5 wherein said shelf is tapered from said border inwardly into said pocket.

7. A blade according to claim 6 wherein said shelf is tapered to said submerged ribs and along adjoining cells thereat.

8. A blade according to claim 7 wherein said shelf is continuous around said pocket perimeter and border.

9. A blade according to claim 7 wherein said shelf has a different taper than said cells thereat.

10. A blade according to claim 1 wherein:
    said ribs are convex in section; and
    said pocket includes a shelf around said perimeter blending with said border.

11. A blade according to claim 10 wherein:
    said ribs have tapered sides blending with said cells; and
    said shelf is tapered from said border inwardly into said pocket.

12. A blade according to claim 11 wherein said rib taper is different than said shelf taper.

13. A blade according to claim 12 wherein said rib taper is greater than said shelf taper.

14. A blade according to claim 13 wherein said shelf taper is less than a taper of said cells thereat.

15. A blade according to claim 11 wherein:
    said rib taper is less than or equal to about 60 degrees;
    said shelf taper is shallow, and less than or equal to about 20 degrees; and
    wherein said ribs are submerged in said filler within the range of about 0.5–2.5 mm, and said filler defines an exposed portion of said airfoil first side coextensive with said border.

16. A gas turbine engine fan blade comprising: a metal airfoil having first and second opposite sides extending radially between a root and a tip, and axially between a leading edge and a trailing edge for pressurizing air channeled thereover;
    said airfoil further including a pocket disposed in said first side, and having a perimeter extending along a border of said first side around said leading and trailing edges, root, and tip;
    said pocket including a plurality of cells separated by corresponding ribs being convex in section, and said pocket includes a shelf around said perimeter blending with said border, and said shelf is tapered from said border inwardly into said pocket; and
    a filler bonded in said pocket, with said ribs being submerged therein.

17. A blade according to claim 16 wherein said ribs are substantially equally submerged in said filler.

18. A blade according to claim 17 wherein said filler is flush with said border, and defines therewith a continuous surface exposed to said air channeled thereover.

19. A blade according to claim 18 wherein said filler is elastomeric bonded to a primer covering said cells, ribs, and shelf.

20. A blade according to claim 19 further comprising:
    a shank joined integrally with said airfoil root; and
    a dovetail joined integrally with said shank for mounting said blade to a rotor disk.

* * * * *